Oct. 17, 1939.  L. HAWKINS  2,176,814
HEN LAYING CAGE
Filed Aug. 23, 1938  4 Sheets-Sheet 4
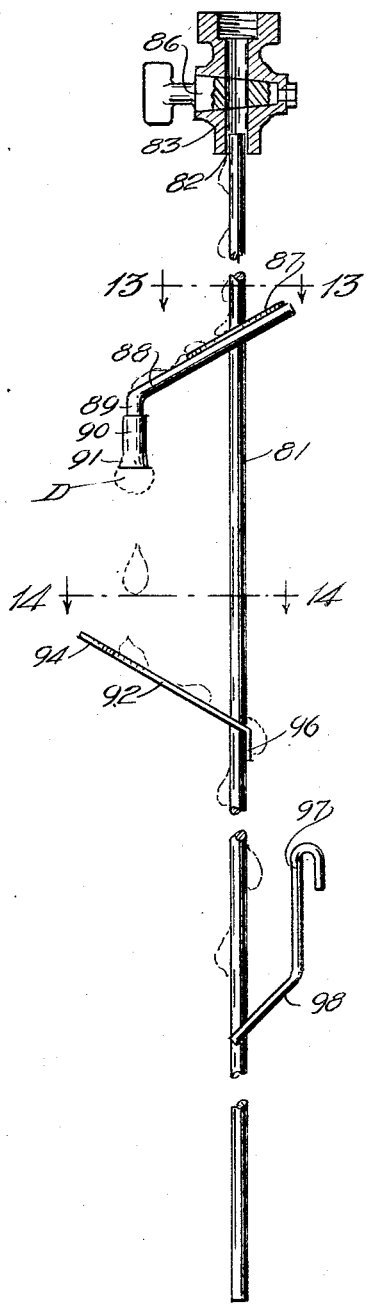
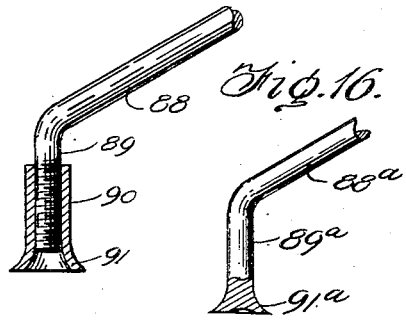
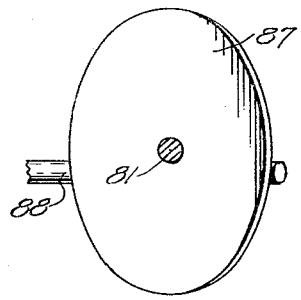
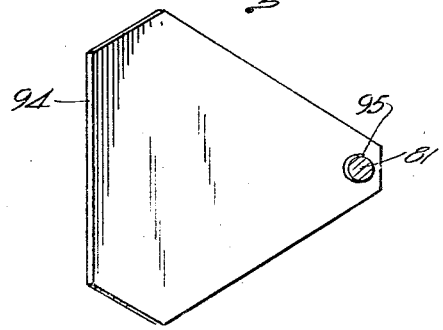
Inventor
LUTY HAWKINS,
By Kimmel & Crowell
Attorneys Patented Oct. 17, 1939

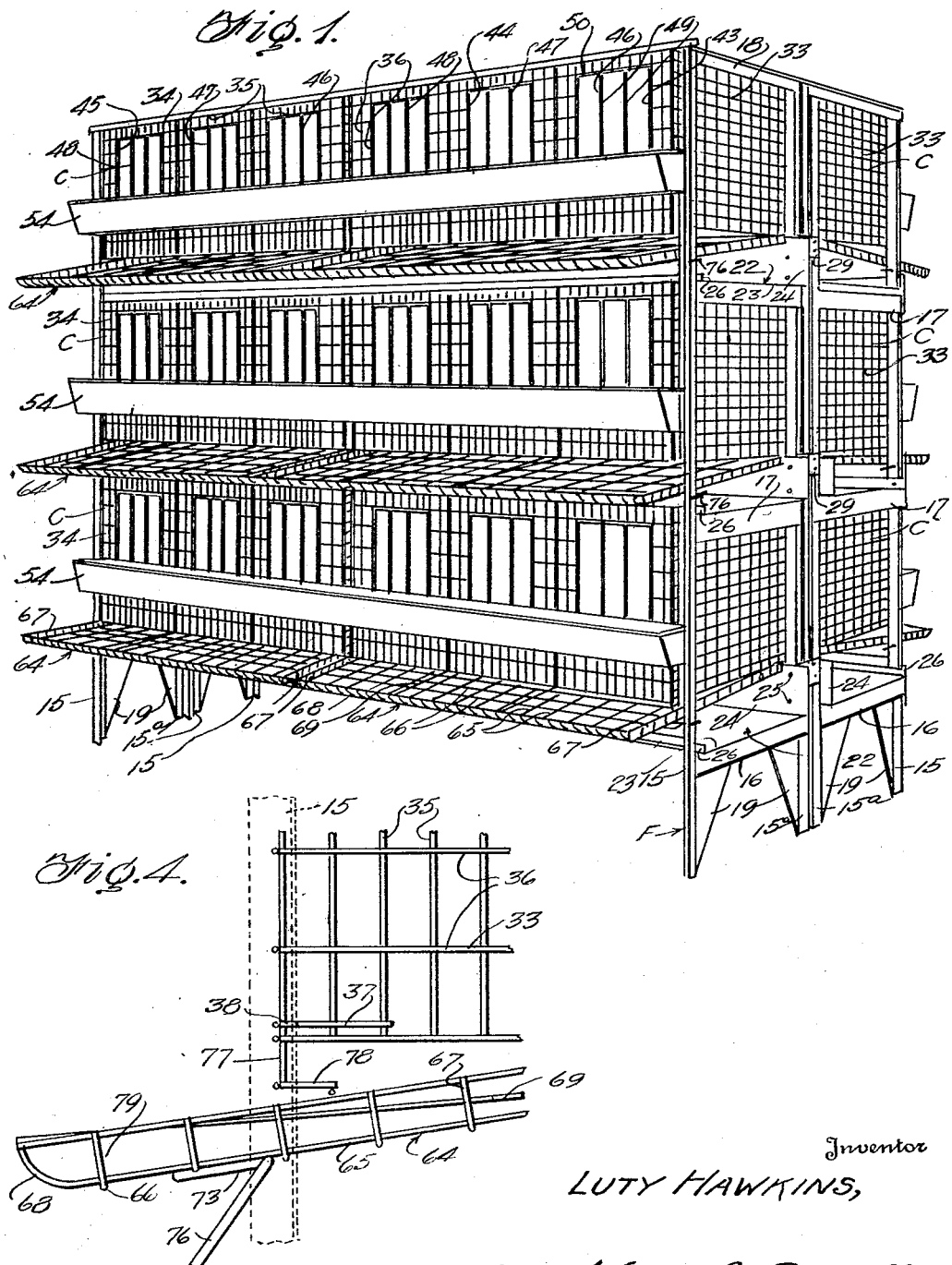

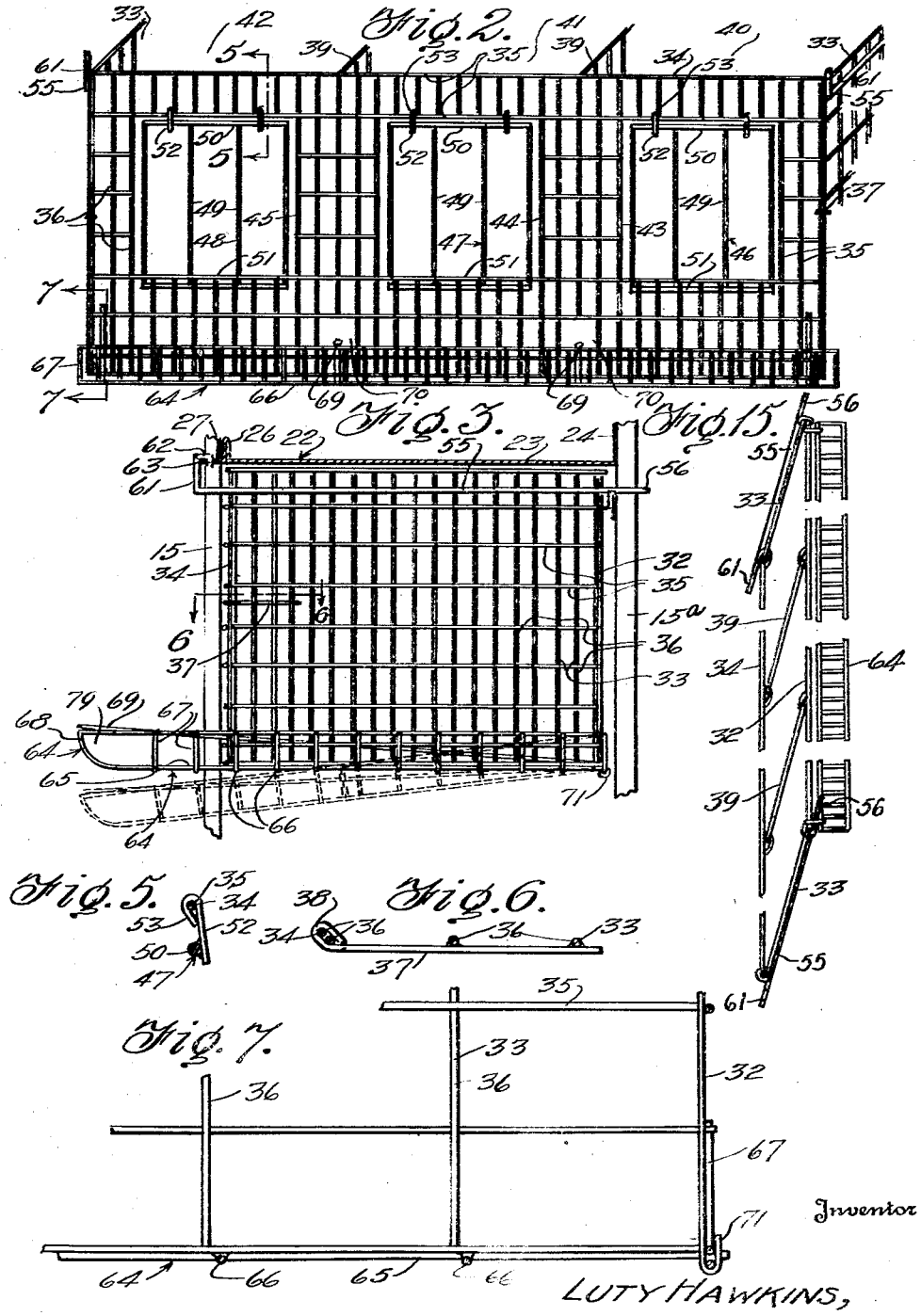

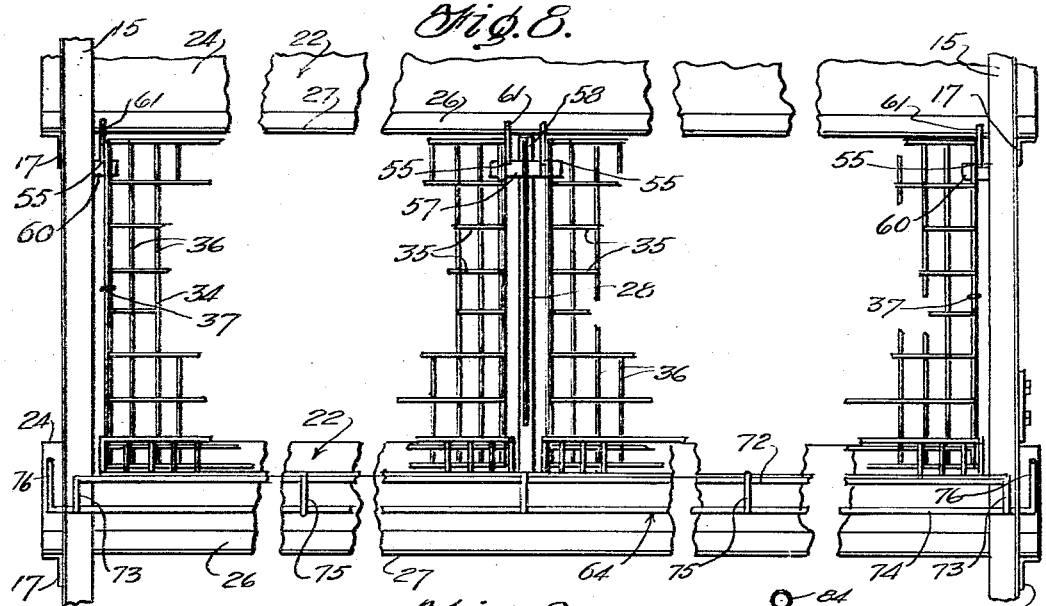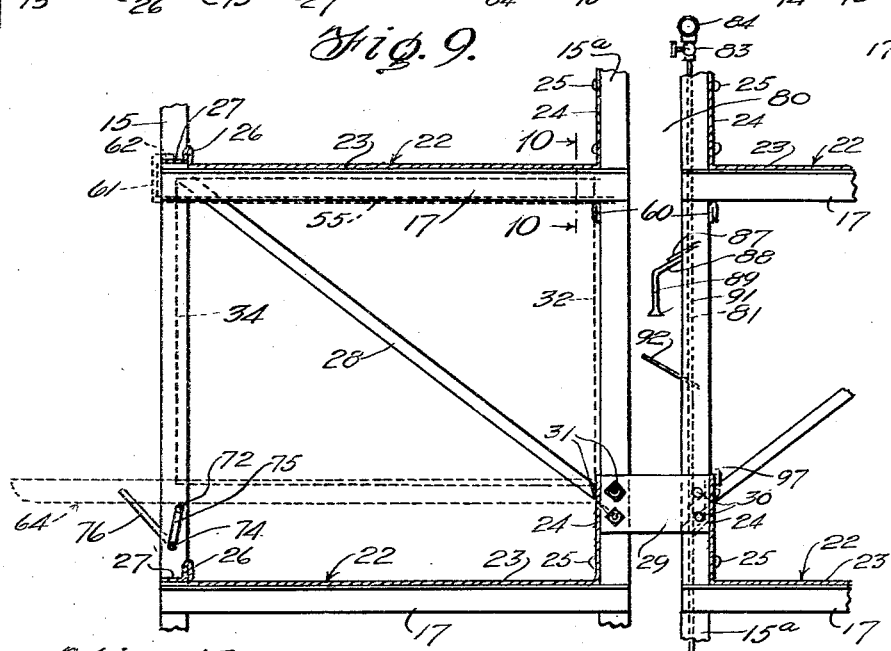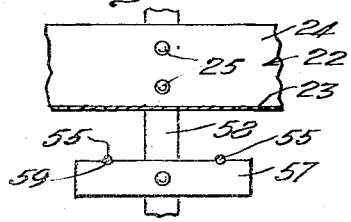

2,176,814

UNITED STATES PATENT OFFICE 2,176,814

HEN LAYING CAGE

Luty Hawkins, Mount Vernon, Ill., assignor to Hawkins Million Dollar Hen, Inc., Mount Vernon, Ill.

Application August 23, 1938, Serial No. 226,364

15 Claims. (Cl. 119—48)

This invention relates to cages for laying hens and more particularly to a cage so constructed that it may be positioned in a supporting frame so as to provide a battery of cages for hens.

An object of this invention is to provide an improved cage structure for a battery of cages which will permit the hen in each compartment thereof to assume a position of rest during the period when the hen is not laying so as not to unduly agitate the hen during this rest period.

Another object of this invention is to provide a cage structure of this kind with a tiltable floor structure which may be tilted to an angle inclined to the horizontal so that the egg laid by the hen will gravitatingly roll out into a collecting trough positioned forwardly of the front wall of the cage.

A further object of this invention is to provide a cage structure including a plurality of compartments for holding a single hen in each compartment, the cage including a swingable bottom structure and means carried by the front wall of the cage so as to prevent the hen from picking the egg which is adapted to roll out into a collecting trough forwardly of the front wall of the cage.

A still further object of this invention is to provide in a battery of cages of this kind an improved means to provide fresh water for the hens so that the water cannot at any time become polluted.

A further object of this invention is to provide in a cage structure of this kind a watering means which is adapted to attract the attention of the hen, the watering means including a dripping device whereby drops of water are constantly dropped in a position whereby the hen may readily reach the drops.

A further object of this invention is to provide a watering means of this kind which is disposed in a position intermediate the rear walls of adjacent cages so that a single watering means will provide water for hens in a pair of cages.

A further object of this invention is to provide an improved supporting means for a battery of cages which includes a frame structure and means for dependingly supporting the cages in the frame.

A further object of this invention is to provide a battery of this kind whereby a plurality of cages may be supported one above the other and whereby the droppings may be readily and quickly removed without unduly disturbing the hens.

To the above ends essentially and to others which may hereinafter appear, the invention consists of the novel construction, combination and arrangement of parts as will be more specifically described and illustrated in the accompanying drawings wherein is shown an embodiment of the invention, but it is to be understood that changes, variations and modifications may be resorted to which fall within the scope of the invention as claimed.

In the drawing:

Figure 1 is a perspective view of a battery of cages constructed according to the embodiment of this invention, Figure 2 is a fragmentary perspective view of one of the cages, Figure 3 is a detail end elevation of a cage disposed in the frame structures, the frame being partly broken away, Figure 4 is a fragmentary side elevation of one of the cages showing the bottom in a laying position, Figure 5 is an enlarged sectional view taken on the line 5—5 of Figure 2, Figure 6 is an enlarged sectional view taken on the line 6—6 of Figure 3.

Figure 7 is an enlarged fragmentary sectional view taken on the line 7—7 of Figure 2 at the rear of this figure, Figure 8 is a fragmentary detail front elevation of the battery, Figure 9 is a fragmentary end elevation of the frame structure showing in dotted lines the position of a cage mounted in the frame, Figure 10 is an enlarged sectional view taken on the line 10—10 of Figure 9, Figure 11 is a detail side elevation partly broken away and partly in section of the watering device, Figure 12 is an enlarged sectional view partly in elevation of the drop forming device, Figure 13 is a sectional view taken on the line 13—13 of Figure 11, Figure 14 is an enlarged sectional view taken on the line 14—14 of Figure 11, Figure 15 is a fragmentary elevation of one of the cages in substantially collapsed position, and Figure 16 is a fragmentary side elevation partly broken away and in section of a modified form of drop forming means.

Referring to the drawings the character F designates a frame structure for supporting a plurality of cages generally designated as C. The frame structure F comprises upright angle bars 15, 15a and bars 16, 17 and 18. The angle bar or end member 16 is a bottom bar to which bracing member 19 may be secured, the bracing members 19 being also secured to the upright posts or bars 15 and 15a so as to provide legs for supporting the lowermost cages C in upwardly spaced relation to a floor or the like. The end bars 17 are intermediate bars and the end bar 18 is an upper bar connecting the upper ends of the end posts 15 and 15a together. A plurality of dropping trays or troughs 22 are disposed in the frame F in vertically spaced relation to each other, the troughs 22 being disposed in horizontal position and holding the end frame members in upright position. Each trough 22 comprises a bottom 23 resting on the end bars of the frame structure and the rear edge of the bottom plate 23 has a vertically disposed wall 24 integral therewith which is secured as by bolts, rivets, or other fastening members 25 to the rear posts 15a of the frame F. The forward edge of the bottom 23 is provided with a relatively short front wall 26 which is formed by bending the material upwardly and then downwardly. The material forming the trough 22 is then extended forwardly to provide a front ledge 27 the purpose for which will be hereinafter described.

The frame F may also be braced by angularly disposed bracing member 28 as shown in Figure 9. Preferably, two of these frames F comprise a battery supporting means and one frame F is provided at its rear with a plurality of connecting plates 29 which are secured to the uprights 15a by means of rivets or fastening member 30. This plate 29 is secured as by bolts or fastening members 31 to the other or adjacent frame member so that the rear ends of the two frame members F will be disposed in spaced apart relation. This space is preferably sufficient so that the hens in the cages of one frame cannot pick at the hens in the cages of an adjacent frame.

The cages C comprise a rectangular housing including a rear wall 32, end walls 33 and a front wall 34. This housing comprising the walls 32 and 33 and 34 is open at the top and bottom thereof, and is formed of wire mesh preferably of a plurality of horizontal wire strands 35 and a plurality of vertical wire strands 36 which are welded to the horizontal strands 35. The mesh formed by the strands 35 and 36 is fairly large but is sufficiently small so that the hens cannot pick at each other. The end walls 33 are secured to the front wall 34 by providing a plurality of relatively short wire strands or fastening members 37 which are welded to the vertical strands 36 and the outer ends of these fastening members 37 are bent over as at 38 so as to engage the adjacent end strands 36 of the front wall 34 and an end wall 33. The same type of securing member 37 is used for securing the rear wall 32 to the end walls 33. A pair of partitions or intermediate walls 39 are disposed intermediate the end walls 33 being positioned in parallel relation to the end walls 33 and these intermediate walls or partitions divide the cage C into a plurality of compartments 40, 41 and 42. The front and rear edges of the partitions 39 are secured to the front and rear walls 32 and 34 in the same manner as the end walls 33, that is, by means of the securing members 37.

The front wall 34 is provided with door openings 43, 44, and 45 opening into the compartments 40, 41 and 42 respectively. Door members 46, 47 and 48 are adapted to close the openings 43, 44 and 45 respectively, and each door comprises a plurality of vertical bars 49 which are secured to upper and lower bars 50 and 51 respectively. The doors are preferably of a length slightly greater than the length of the door openings so that the lower bar 51 comprising the lower end of a door is positioned below the lower marginal edge of a door opening. Each door is swingably secured to a horizontal bar 35 defining the upper edge of the door opening by means of hinge members in the form of a pair of short wire strips 52 which are welded at their lower ends to the upper bar 50 of the door and then bent over the form of loop as at 53 so as to loosely engage about the horizontal bar 35 defining the upper edge of the door opening. The vertical bars 49 are spaced apart a sufficient distance so that the hen in the compartment may project her head out through the space between each pair of vertical bars 49 so as to feed from a feeding trough 54 which is secured to the corner post 15 by means of clips or the like.

Each cage C is held within the frame F by means of a pair of horizontally disposed supporting bars 55 which are welded to each end wall 33 of a cage and the rear ends of the supporting bars 55 project beyond the end wall 32 as at 56 for engagement with the upper edge of a supporting bar 57 fixed to an upright 58 intermediate the end members 15a of the frame. The bracing member 28 is connected at its forward or upper end with ledge 27 and its rear or lower end to the upright 58. The supporting member 57 is provided on its upper edge with a pair of recesses 59 in which the extensions 56 engage. Supporting members 60 are provided at each end of the frame F which are secured to the end posts 15a and on which the outermost supporting member 55 rests. The forward ends of the supporting members 55 are bent upwardly at a right angle as at 61 and the upper end of this extension 61 has a rearwardly extending hook 62 adapted to engage in a hole 63 provided in the front ledge 27. In this manner when a cage C is inserted at the frame F the rear extensions 56 are first engaged with the supporting bars 57 and 60 and then pushed rearwardly until the hook 62 engages in the hole 63 provided in the supporting ledge 27 of the trough 22. These supporting members 57 support each cage C in a horizontal position where the upper end of lower cage C is positioned closely adjacent the lower surface of an intermediate trough 22 so that the intermediate trough will constitute a solid top wall for a lower cage member C.

Each cage C is provided with a hinged floor or bottom generally designated as 64 which comprises a wire mesh wall formed of forwardly extending bars 65 and longitudinally extending bars 66. The forwardly extending bars 65 are positioned on top of the longitudinal bars 66 and also constitute guide means for guiding an egg as it rolls forwardly when the trough bottom 64 is disposed in a laying position or in a position inclined to the horizontal. The opposite ends of the bottom structure 64 are upturned as at 67 and each bottom 64 is preferably of a width greater than the length of each end wall 33 so that the forward portion of the bottom or floor 64 will project beyond the floor wall 34. The forward edge of the bottom or floor member 64 is upturned as at 68 thus providing a trough or collector for collecting the eggs as they roll forwardly and downwardly on the bars 65. The bottom 64 extends beneath the three compartments 40, 41 and 42 and preferably a bracing member 69 is secured at its forward end to the upper edge of the upturned portion 68 and at its rear end is secured to the rear end of the bottom structure 64. The bracing member 69 is positioned substantially beneath an intermediate partition 39 and the front wall 34 is preferably recessed or cut out as at 70 so as to receive the bracing member 69 when the floor 64 is in a horizontal or resting position. The rear end of the floor 64 is hingedly secured to the end walls by providing hinge loops 71 at the rear ends of the end walls 33 and similar loops 71 may be provided at intermediate points along the length of the rear wall 32.

The floor or bottom member 64 is supported at its free end by means of a rockable supporting member comprising an elongated rod 72 which is provided with right angular extensions 73 at each end thereof which are welded or otherwise secured to a rock shaft 74 mounted in one leg of the front vertical posts 15. Intermediate bracing members 75 brace the intermediate portions of the bar 72 and are connected to the bar 72 and the shaft 74. The opposite end of the shaft 74 is bent angularly so as to provide a handle 76 which is positioned at an acute angle to the extensions 73 and the shaft 74 is journaled in the end posts 15 in such a position that when the bottom 64 is in a horizontal position the supporting member will be in a position inclined to the vertical as shown in Figure 9. When the bottom 64 is in a laying position as shown in Figure 4 the supporting member will be in a position inclined downwardly a slight degree from the horizontal and the handle 76 will also be inclined downwardly as shown in this figure.

The front wall 34 of each cage C is provided with an extension 77 at its lower end and an inwardly projecting ledge 78 is carried by the extension 77. This ledge 78 is adapted to project down into the bottom or floor member 64 when this member 64 is in a horizontal or resting position, and when the bottom member 64 is in the laying or inclined position as shown in Figure 4 the ledge 78 provides an inwardly projecting flange or member which prevents a hen from contacting with an egg positioned in the trough 79 formed by the extension of the bottom 64.

As shown in Figure 1 a battery of these cages comprises a pair of frame members F disposed with their rear ends in confronting relation and spaced apart a slight distance and at least two cages C in spaced relation above each trough 22. There are disclosed three tiers of cages C but it will be understood that the number of tiers may be varied and if desired the number of cages in endwise spaced relation may also be varied. The connecting plates 29 hold the rear ends of the frame members F in spaced apart relation and in the space 80 between adjacent frames F there is positioned a watering means. This watering means comprises a vertically disposed rod 81 which at its upper end is adapted to loosely engage in the discharge opening 82 of a valve 83. The valve 83 is connected to a supply pipe 84 which may extend along the upper edge of the battery with the rod 81 extending from the upper edge to a point below the lower-most trough 22. A collecting pan or trough 85 is positioned below the lower end of the rod 81 so that the water will drop down into the trough 85 and be carried to a suitable point of discharge. The valve 83 may have the valve plug 86 thereof turned to an open position sufficient so that only a relatively small quantity of water will flow out of the valve 83, this quantity being in the form of drops which are adapted to flow down the rod 81. A plate 87 is secured to the rod 81 in substantially the axial center thereof in a downwardly inclined position and a rod or bar 88 having a vertically disposed extension or lower end 89 is secured as by welding or the like to the undersurface of the plate 87. A sleeve 90 is threaded onto the lower end of the vertical extension 89 and is provided at its lower end with a flared or bell shaped drop forming portion 91. This bell portion 91 is so constructed that a relatively large drop D will form on the flared or underside of the drop forming portion 91 so that the hens in adjacent cages C can readily pick at the drop before it leaves the drop forming portion 91. The drop D is adapted to fall down onto an inclined plate 92 which is provided with a relatively wide upper end portion 94 tapering downwardly toward the rod 81. The plate 92 is provided with an opening 95 adjacent the rod 81 so that the water moving downwardly on the upper surface of the plate 92 will enter the opening 95 and contact with the rod 81 down which the water will then flow. The lower end of the plate 91 is provided with a vertical extension 96 which may be secured as by welding or the like to the adjacent surface of the rod 81. The rod 81 is supported in a vertical position by means of a hook-shaped supporting member 97 provided with an obliquely disposed extension 98 secured as by welding to the rod 81. The hook member 97 as shown in Figure 9 is adapted to engage over the upper edge of the rear wall 24 of a trough 22 and if desired a number of these supporting members may be provided along the length of the rod 81 so that the rod 81 will be rigidly supported in operative position. The vertical extension 89 of the drop forming member is adapted to be disposed substantially mid-way between the rear ends of adjacent cages C so that a hen from either cage may drink from the water dropping down from the drop forming member 91. The plate member 87 may be dished a slight degree outwardly of the bar 88 so as to provide a channel in which the water is adapted to flow in order that the water will readily flow off of the plate 87 and contact with the guide member or rod 88. In like manner the receiving plate 92 may be provided with a concave upper surface ending with the opening 95 so that when the drops engage the plate 92 the water will not flow off of the plate but will be directed toward the opening.

In the use and operation of this battery a single hen is placed in a compartment through the door therefor, and during the night or at such other times as the hen is not apt to lay an egg the bottom or floor member 64 is disposed in a substantially horizontal position shown in full lines in Figure 3. The bottom 64 is held in this horizontal position by means of the supporting member comprising the bar 72. At this time the handle 76 is in an upwardly inclined position as shown in full lines in Figure 9. In this horizontal position the hen may be in position of rest and will not be unduly agitated as is the case when the bottom 64 is in a downwardly inclined position as shown in Figure 4. The bottom 64 is tilted downwardly by rocking the handle 76 to the full line position shown in Figure 4 when the hen is in her laying period. At this time the inclination of the bottom 64 will tend to agitate the hen so that the hen will more readily lay, and when the egg has been laid the egg will roll down the forwardly extending guide bars 65 and enter the receiving trough 79. The trough 79 is of such depth that the egg will be positioned a sufficient distance from the front wall 34 of the cage so that the hen cannot reach out beneath the ledge 78 and pick at the egg. This ledge 78 is also positioned a sufficient distance upwardly from the bottom bars 65 so that the egg may freely roll out beneath the inner edge of the ledge 78 and into the trough 79.

The dropping troughs 22 may be readily cleaned at desired intervals by raising the bottom 64 to a horizontal position and then inserting a scrapper beneath the shaft 74. There are preferably a number of the fountains in the space 80 between the rear ends of the frame members F so that for each pair of compartments which are disposed in rear end abutting relation there will be at least one fountain, and these fountains will discharge into the receiving or collecting pan or trough 85 shown in Figure 9.

In Figure 15 there is shown the manner in which each of the cages disclosed herein may be collapsed for purposes of shipment. In order to collapse each cage, the bottom or tray member 64 is swung downwardly and then positioned flat against the back wall 32. The front wall 34 and the end walls 33 with the intermediate walls or partitions 39 may then be collapsed as shown in Figure 15 by swinging the front wall 34 on the pivotal connections between the end walls 33 and the intermediate walls 39. In this manner the cage can be collapsed so as to occupy only relatively small space and thus readily pack in a narrow crate for shipment.

In Figure 16 there is disclosed a modified form of drop forming means wherein the downwardly extending rod 88$^a$ has a dependent portion 89$^a$, the lower end of which is enlarged in substantially bell shaped form as at 91$^a$ so that when the water flows downwardly over the rod 88$^a$ then down the vertical rod 89$^a$ the water will gather on the underside of the bell shaped portion 91$^a$ and thus form a relatively large drop which may be contacted with by the hen. With a construction of this kind the entire drop forming means may be made from a single rod having the lower end upset or enlarged to form the bell shaped portion 91$^a$. When the uppermost cages are used for laying hens suitable closures for the tops thereof are employed.

What I claim is:

1. A cage battery for laying hens comprising in combination, a supporting frame structure, and a plurality of cages carried by said frame structure, each of said cages comprising a rectangular wire mesh member having an open bottom, a floor hingedly secured at its rear end to said member, and means carried by said frame engaging said floor for holding said floor in a horizontal resting position or an inclined laying position.

2. A cage battery for layng hens comprising a frame, a plurality of dropping troughs fixed to said frame in superposed spaced parallel relation, a plurality of cage members between said troughs and each formed with compartments, said cage members being open at the top and bottom thereof, an upper trough closing the open top of a lower cage member, means securing said cage members in said frame, a reticulated trough-like floor for each cage member common to the compartments of the latter and arranged over a trough, said floors extending outwardly from the cage members, means hingedly securing the rear end of each floor to a cage member, and superposed means carried by the frame engageable with the floors for selectively holding them in either a horizontal position or a position inclined to the horizontal.

3. A battery of cages comprising a frame structure, superposed spaced troughs supported in said structure, superposed cages disposed in said frame structure and including hinged reticulated bottoms arranged over said troughs, a second frame structure, superposed spaced troughs supported in said second structure, superposed cages in said second frame structure and including hinged reticulated bottoms arranged over the troughs in the second structure, means securing the rear portions of said frame structures together in spaced parallel relation, and means disposed in the space between said frame structures providing a continuous water supply between confronting cages, said water supply extending vertically of said cages and provided intermediate its ends with superposed spaced oppositely downwardly inclined water deflectors, one being formed with a water discharge opening adjacent its lower end, and a vertical water dropper spaced from the lower end of and connected to another one of the deflectors.

4. In a battery of cages including a plurality of cages disposed with confronting walls thereof in spaced apart relation, a watering means between the confronting walls comprising a vertically disposed rod, a laterally extending support secured to said rod, a pair of vertically spaced apart plates fixed to said rod and disposed on opposed angles, and a drop forming means carried by the uppermost of said plates.

5. A hen laying battery comprising a frame, a plurality of dropping troughs secured to said frame in vertically spaced apart relation, a forwardly projecting part carried by each trough at the front edge thereof, a plurality of superposed cages in said frame between said troughs, horizontal supporting bars secured to the end walls of the cages having hook-shaped forward ends engageable with the parts of the upper ones of the troughs to dependingly support the front portions of said cages, said bars projecting rearwardly of the rear of said frame and means carried by the frame coacting with the rear portions of said bars to dependingly support the rear portions of said cages.

6. A hen laying battery comprising a frame, a plurality of superposed cages in said frame, spaced superposed dropping troughs within and secured to said frame and between which said cages are arranged, means secured to the cages, engaging in the upper ones of the said troughs and supported by said frame for supporting said cages in a horizontal position in said frame, a bottom wall for each cage swingably secured at its rear edge to a cage, and superposed actuatable means carried by said frame selectably engageable with said bottom walls for maintaining a bottom wall in either a horizontal position or a position inclined to the horizontal.

7. A hen laying battery comprising a frame, a pair of endwise aligned cages in said frame, spaced means having one end connected with the frame, the other end supported by the frame and secured intermediate their ends to the cages for connecting the cages to and for suspending them from the frame within the latter, a swingable bottom wall for each cage, and a common bottom wall controlling member carried by said frame whereby to maintain said bottom walls in either a horizontal position or a position inclined to the horizontal.

8. A hen laying battery comprising a frame, pairs of superposed cages in said frame, a trough fixed to said frame between said pairs of cages, a trough fixed to said frame above the upper cage, a pair of rods secured to each cage at the ends thereof, the rear ends of each rod extending beyond the rear of each cage, a forwardly and upwardly offset hook carried by the front end of each rod, means fixed in said frame engageable with said rear ends of said rods for supporting the rear portions of said cages, and means carried by said troughs engageable with said hooks supporting the front portions of said cages.

9. A hen laying battery comprising a frame, pairs of superposed cages in said frame, a trough fixed to said frame between said pairs of cages, a trough fixed to said frame above the upper cage, a pair of rods secured to each cage at the ends thereof, the rear ends of each rod extending beyond the rear of each cage, a forwardly and upwardly offset hook carried by the front end of each rod, means fixed in said frame engageable with said rear ends of said rods for supporting the rear portions of said cages, means carried by said troughs engageable with said hooks supporting the front portions of said cages, a bottom wall swingably carried by each cage, a shaft extending horizontally beneath each pair of cages, operating means for each shaft, and means extending laterally of each shaft and fixed thereto engageable with the bottom walls of a pair of cages for holding said bottom walls in horizontal position when said latter means is in an upright position.

10. In a battery of cages a pair of frame members, means securing said members together with the rear portions thereof in spaced apart relation, superposed cages in said frame members and a watering means between said frame members, said watering means comprising a supply pipe, a valve connected to said pipe, a vertically disposed rod having the upper end thereof loosely disposed in said valve, a laterally offset supporting member fixed to said rod and engageable with one of said frame members to support said rod in vertical position, a pair of oppositely inclined plates fixed to said rod in vertically spaced apart relation, and a drop forming means fixed to the uppermost of said plates.

11. In a battery of cages a pair of frame members, means securing said members together with the rear portions thereof in spaced apart relation, superposed cages in said frame members and a watering means between said frame members, said watering means comprising a supply pipe, a valve connected to said pipe, a vertically disposed rod having the upper end thereof loosely disposed in said valve, a laterally offset supporting member fixed to said rod and engageable with one of said frame members to support said rod in vertical position, a pair of oppositely inclined plates fixed to said rod in vertically spaced apart relation, the uppermost of said plates being inclined downwardly from said rod, the lowermost of said plates being inclined downwardly toward said rod, an obliquely disposed guide member carried by the upper of said plates, and a flared drop forming means carried by said guide member.

12. A watering means for a battery of hen laying cages comprising a vertically disposed rod adapted at the upper end thereof to loosely engage in the outlet side of a valve connected to a source of water supply, a downwardly inclined plate fixed to said rod below the upper end thereof, a rod fixed to said plate and extending downwardly of the lower edge thereof, a vertically disposed extension carried by said second rod, flared drop forming means carried by said extension, a second upwardly inclined plate fixed to said first rod below said drop forming means, and means carried by said first rod for supporting said first rod in vertical position.

13. A hen laying cage comprising a reticulated open top housing having front, rear and end walls, partitions within said housing to form it with a plurality of compartments, a reticulated bottom wall for said housing of trough-like form swingably secured at its rear edge to the lower portion of said rear wall and extending forwardly from the housing below the said front wall of the latter, said bottom wall being common to said compartments, bracing means for said bottom wall, said front wall being provided with clearance means for said bracing means, a dropping trough arranged below and independent of said bottom wall, and an inwardly projecting ledge integral with said front wall at the lower end of the latter, extending into said bottom wall and constituting a guard.

14. A hen laying cage comprising a reticulated open top housing having front, rear and end walls, partitions within said housing to form it with a plurality of compartments, a reticulated bottom wall for said housing of trough-like form swingably secured at its rear edge to the lower portion of said rear wall and extending forwardly from the housing below the said front wall of the latter, said bottom wall being common to said compartments, bracing means for said bottom wall, said front wall being provided with clearance means for said bracing means, a dropping trough arranged below and independent of said bottom wall, an inwardly projecting ledge integral with said front wall at the lower end of the latter, extending into said bottom wall and constituting a guard, and means positioned below said bottom member in forward relation with respect to said front wall for controlling selectable positions of said bottom wall.

15. A battery of cages for laying hens, said battery comprising a pair of frame structures of like form having their rear portions disposed in spaced parallel relation, means for securing said structures together in said spaced relation, a pair of oppositely disposed banks of superimposed cages of like form arranged in said structures and with each cage of each bank having a shiftably mounted reticulated trough-like bottom extended outwardly from the front of the cage, a water supply controlling valve having a discharge opening, a vertically disposed rod arranged in the space between said structures and provided with means correlating with a cage of a bank for suspending it, said rod at its upper end loosely extending in said opening, a pair of spaced superposed oppositely downwardly inclined deflectors encompassing and secured to said rod intermediate the ends of the latter, a vertically disposed dropper spaced from and arranged below the lower end of one of said deflectors, means for connecting said dropper to such deflector, and the other one of said deflectors provided with a water discharge opening in proximity to its lower end.

LUTY HAWKINS.